US008320339B2

United States Patent
Dong et al.

(10) Patent No.: US 8,320,339 B2
(45) Date of Patent: Nov. 27, 2012

(54) ORTHOGONAL RESOURCE REUSE WITH SDMA BEAMS

(75) Inventors: Min Dong, San Diego, CA (US); Alexei Gorokhov, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/252,405

(22) Filed: Oct. 4, 2011

(65) Prior Publication Data

US 2012/0020316 A1 Jan. 26, 2012

Related U.S. Application Data

(62) Division of application No. 11/737,667, filed on Apr. 19, 2007, now Pat. No. 8,036,669.

(60) Provisional application No. 60/794,001, filed on Apr. 20, 2006.

(51) Int. Cl.
*H04B 7/216* (2006.01)

(52) U.S. Cl. ........ 370/335; 370/203; 370/208; 370/328; 370/329; 370/341; 370/342; 370/343; 455/447; 455/450; 455/451; 455/452.1; 455/509; 455/562.1

(58) Field of Classification Search .................. 375/260, 375/267, 299; 455/447, 450, 451, 452.1, 455/452.2, 509, 562.1, 24, 25, 63.4, 68, 69; 370/203, 208, 328, 329, 330, 335, 341, 342, 370/343

See application file for complete search history.

(56) References Cited

U.S. PATENT DOCUMENTS

| 5,061,924 | A  | 10/1991 | Mailhot |
|-----------|----|---------|---------|
| 6,192,256 | B1 | 2/2001  | Whinnett |
| 6,453,176 | B1 * | 9/2002 | Lopes et al. ............... 455/562.1 |
| 6,640,104 | B1 | 10/2003 | Borst et al. |
| 6,804,521 | B2 | 10/2004 | Tong et al. |
| 6,836,674 | B2 | 12/2004 | Taniguchi et al. |
| 6,973,287 | B2 | 12/2005 | Franzen et al. |
| 6,999,795 | B2 | 2/2006  | Chitrapu et al. |

(Continued)

FOREIGN PATENT DOCUMENTS

CN 1170282 1/1998
(Continued)

OTHER PUBLICATIONS

Vahid Tarokh, Siavash M. Alamouti, Yang-Seok Choi, Complementary Beamforming: New Approaches, Jan. 2006, IEEE Transactions on Communications, vol. 54, No. 1, pp. 41-50.*

(Continued)

*Primary Examiner* — Olumide T Ajibade Akonai
(74) *Attorney, Agent, or Firm* — Charles E. Eggers

(57) ABSTRACT

A wireless communication system can implement beamforming across multiple omni-directional antennas to create beams at different spatial directions. The communication system can arrange the beams in sets, with each set arranged to provide substantially complete coverage over a predetermined coverage area. The communication system can arrange the multiple SDMA beam sets to support substantially complementary coverage areas, such that a main beam from a first set provides coverage to a weak coverage area of the second beam set. The wireless communication system assigns or otherwise allocates substantially orthogonal resources to each of the beam sets. The wireless communication system allocates resources to a communication link using a combination of beam sets and substantially orthogonal resources in order to provide improved coverage without a corresponding increase in interference.

32 Claims, 12 Drawing Sheets

U.S. PATENT DOCUMENTS

| | | | |
|---|---|---|---|
| 7,065,149 B2 * | 6/2006 | Ghavami et al. | 375/267 |
| 7,099,698 B2 * | 8/2006 | Tarokh et al. | 455/562.1 |
| 7,139,328 B2 * | 11/2006 | Thomas et al. | 375/299 |
| 7,257,167 B2 * | 8/2007 | Lau | 375/295 |
| 7,324,782 B1 | 1/2008 | Rudrapatna | |
| 7,336,727 B2 * | 2/2008 | Mukkavilli et al. | 375/299 |
| 7,340,281 B2 | 3/2008 | Zeira et al. | |
| 7,400,606 B2 | 7/2008 | Padovani et al. | |
| 7,620,019 B1 * | 11/2009 | Smith et al. | 370/334 |
| 7,684,761 B2 * | 3/2010 | Hottinen | 455/69 |
| 7,702,353 B2 | 4/2010 | Naden et al. | |
| 2004/0136342 A1 | 7/2004 | Pedersen et al. | |
| 2004/0196800 A1 | 10/2004 | Padovani et al. | |
| 2004/0242272 A1 | 12/2004 | Aiken et al. | |
| 2005/0037799 A1 | 2/2005 | Braun et al. | |

FOREIGN PATENT DOCUMENTS

| | | | |
|---|---|---|---|
| CN | 1440625 A | | 9/2003 |
| CN | 1528099 A | | 9/2004 |
| EP | 0895436 A2 | | 2/1999 |
| EP | 1113586 A2 | | 7/2001 |
| EP | 1113686 A2 | | 7/2001 |
| EP | 1562306 A1 | * | 8/2005 |
| JP | 2003244054 A | | 8/2003 |
| JP | 2004508744 | | 3/2004 |
| JP | 2004297750 A | | 10/2004 |
| JP | 2005094337 | | 4/2005 |
| JP | 2005094337 A | * | 4/2005 |
| RU | 2213420 C2 | | 9/2003 |
| RU | 2232483 C2 | | 7/2004 |
| WO | WO2007124460 | | 11/2007 |

OTHER PUBLICATIONS

European Search Report—EP11001324—Search Authority—Munich—Apr. 8, 2011.

International Preliminary Report on Patentability—PCT/US07/067149—The International Bureau of WIPO, Geneva, Switzerland—Oct. 22, 2008.

International Search Report—PCT/US07/067149—International Search Authority, European Paten Office—Sep. 24, 2007.

Taiwan Search Report—TW096114066—TIPO—Mar. 15, 2011.

Written Opinion—PCT/US07/067149—International Search Authority, European Patent Office—Sep. 24, 2007.

* cited by examiner

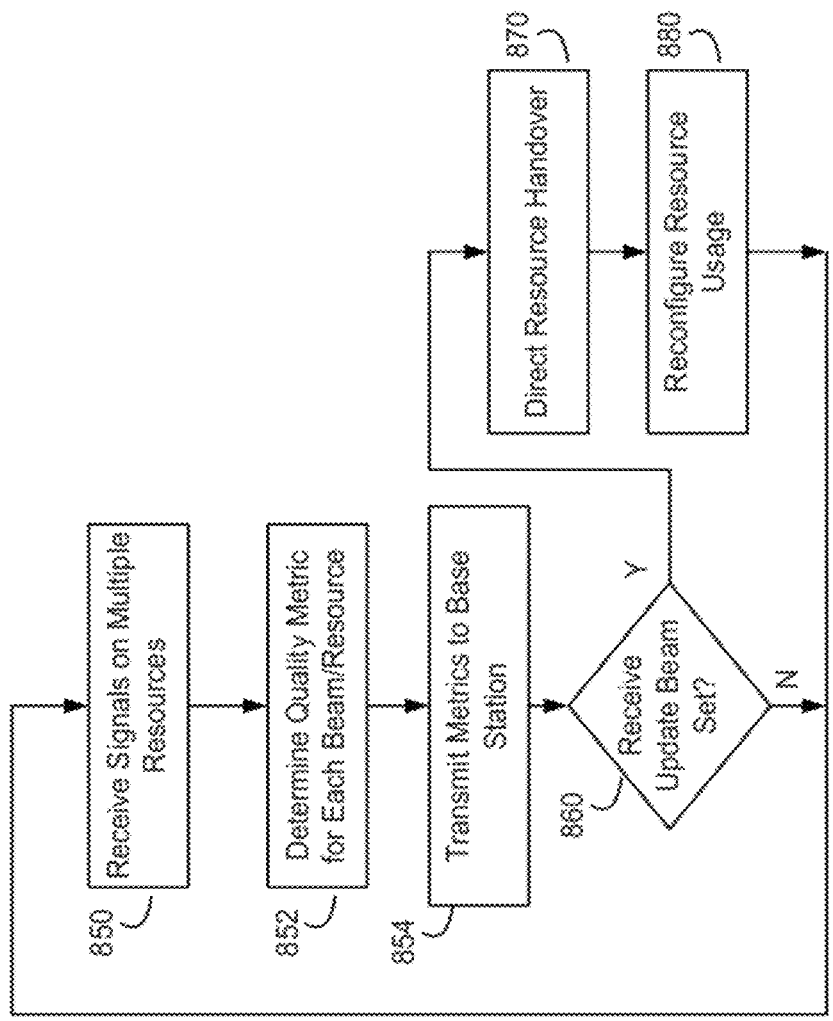

ORTHOGONAL RESOURCE REUSE WITH SDMA BEAMS

CROSS-REFERENCES TO RELATED APPLICATIONS

This application is a divisional of application Ser. No. 11/737,667, filed Apr. 19, 2007, entitled "ORTHOGONAL RESOURCE REUSE WITH SDMA BEAMS," which claims the benefit of U.S. Provisional Application No. 60/794,001, filed Apr. 20, 2006, entitled "ADAPTIVE RESOURCE REUSE IN SDMA WIRELESS COMMUNICATION," and assigned to the assignee hereof and hereby expressly incorporated by reference herein.

BACKGROUND OF THE INVENTION

The present document relates generally to wireless communication and more specifically to resource allocation in space-division multiple access (SDMA) wireless communication systems.

Wireless communication systems have become a prevalent means by which a majority of people worldwide has come to communicate. Wireless communication devices have become smaller and more powerful in order to meet consumer needs and to improve portability and convenience. Consumers have found many uses for wireless communication devices such as cellular telephones, personal digital assistants (PDAs) and the like, demanding reliable service and expanded areas of coverage.

System capacity is a typical constraint that limits the ability of a system to provide reliable service to communication devices within a given coverage area. Wireless communication systems utilize various techniques that contribute to increasing system capacity.

Space Division Multiple Access (SDMA) is a technique that can be implemented in a multiple antenna communication system. SDMA utilizes the spatial dimension to support more terminals for data or information transmissions. The SDMA utilizes the spatial signatures of the terminals and schedules multiple data transmissions on each link that have (ideally) orthogonal spatial signatures to one another.

A wireless communication system can implement SDMA in various ways. One method is to utilize beamforming or otherwise directional antenna patterns. However, SDMA systems utilizing beamformed or otherwise directional antenna may suffer from weak coverage areas between beams or increased interference due to overlapping beams.

BRIEF SUMMARY OF THE INVENTION

A wireless communication system can implement beamforming across multiple omni-directional antennas to create beams at different spatial directions. The communication system can arrange the beams in sets, with each set arranged to provide substantially complete coverage over a predetermined coverage area. The communication system can arrange the multiple SDMA beam sets to support substantially complementary coverage areas, such that a main beam from a first set provides coverage to a weak coverage area of the second beam set.

The wireless communication system assigns or otherwise allocates substantially orthogonal resources to each of the beam sets. The substantially orthogonal resources can be, for example, time, frequency, code, and the like, or some combination thereof.

The wireless communication system allocates resources to a communication link using a combination of beam sets and substantially orthogonal resources in order to provide improved coverage without a corresponding increase in interference. For example, the wireless communication system can assign a beam from a beam set and the frequency or other orthogonal resource corresponding to the beam set to a particular communication link.

Aspects of the invention include a method of resource reuse in a wireless communication system. The method includes determining terminal information, determining a first beam in a first beam set from a plurality of beam sets based upon the terminal information, each beam in the first beam set associated with a subset of resources of a plurality of resources, and transmitting signals utilizing the first beam in the first beam set on at least some of the subset of resources.

Aspects of the invention include a method of resource reuse in a wireless communication system. The method includes receiving a plurality of signals that are transmitted over at least some of a plurality of substantially orthogonal resources, determining at least one quality metric based upon the plurality of signals, transmitting a communication to a base station based on the at least one quality metric, and receiving a signal associated with a beam of a beam set and with a subset of the plurality of orthogonal resources associated with the beam set.

Aspects of the invention include a method of resource reuse in a wireless communication system. The method includes determining a beam in first beam set supporting a communication link, each beam in the first beam set associated with a resource, transmitting signals within the beam in the first beam set, and transitioning the signals from the beam in the first beam set to a beam in a second beam set, each beam in the second beam set associated with a resource that is substantially orthogonal to a resource associated with the first beam set.

Aspects of the invention include a method of resource reuse in a wireless communication system. The method includes receiving signals across multiple substantially orthogonal resources, determining a quality metric for each of the substantially orthogonal resources, transmitting a communication to a base station based on the quality metrics, and receiving a beamformed signal utilizing at least one of the multiple orthogonal resources based on the communication.

Aspects of the invention include an apparatus configured to support resource reuse in a wireless communication system that includes a transmitter configured to generate a transmit signal utilizing at least one of a plurality of resources based on one or more control signals, a resource controller configured to generate the one or more control signals to the transmitter controlling a selection of the at least one of a plurality of resources, an encoder coupled to the transmitter and the resource controller and configured to encode the transmit signal to a first beam from a first beam set associated with the at least one of the plurality of resources, and a plurality of antennas coupled to the encoder and configured to broadcast the encoded transmit signal in the first beam.

Aspects of the invention include an apparatus configured to support resource reuse in a wireless communication system that includes a receiver configured to receive a plurality of signals corresponding to a plurality of beamformed signals, the plurality of signals associated with at least two distinct resources, a baseband processor configured to process at least a portion of the plurality of signals based on a corresponding resource, and configured to generate at least one quality metric for received signals of each resource, and a resource controller configured to control the receiver and baseband processor to support a particular resource.

Aspects of the invention include an apparatus configured to support resource reuse in a wireless communication system that includes means for determining terminal information, means for determining a first beam in a first beam set from a plurality of beam sets based upon the terminal information, each beam in the first beam set associated with a subset of resources of a plurality of resources, and means for transmitting signals utilizing the first beam in the first beam set on at least some of the subset of resources.

Aspects of the invention include an apparatus configured to support resource reuse in a wireless communication system that includes means for receiving a plurality of signals that are transmitted over at least some of a plurality of substantially orthogonal resources, means for determining at least one quality metric based upon the plurality of signals, means for transmitting a communication to a base station based on the at least one quality metric, and means for receiving a signal associated with a beam of a beam set and with a subset of the plurality of orthogonal resources associated with the beam set.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 8A-8C are simplified flowcharts of embodiments of methods of resource reuse in a SDMA system.

DETAILED DESCRIPTION OF THE INVENTION

Figure 1:
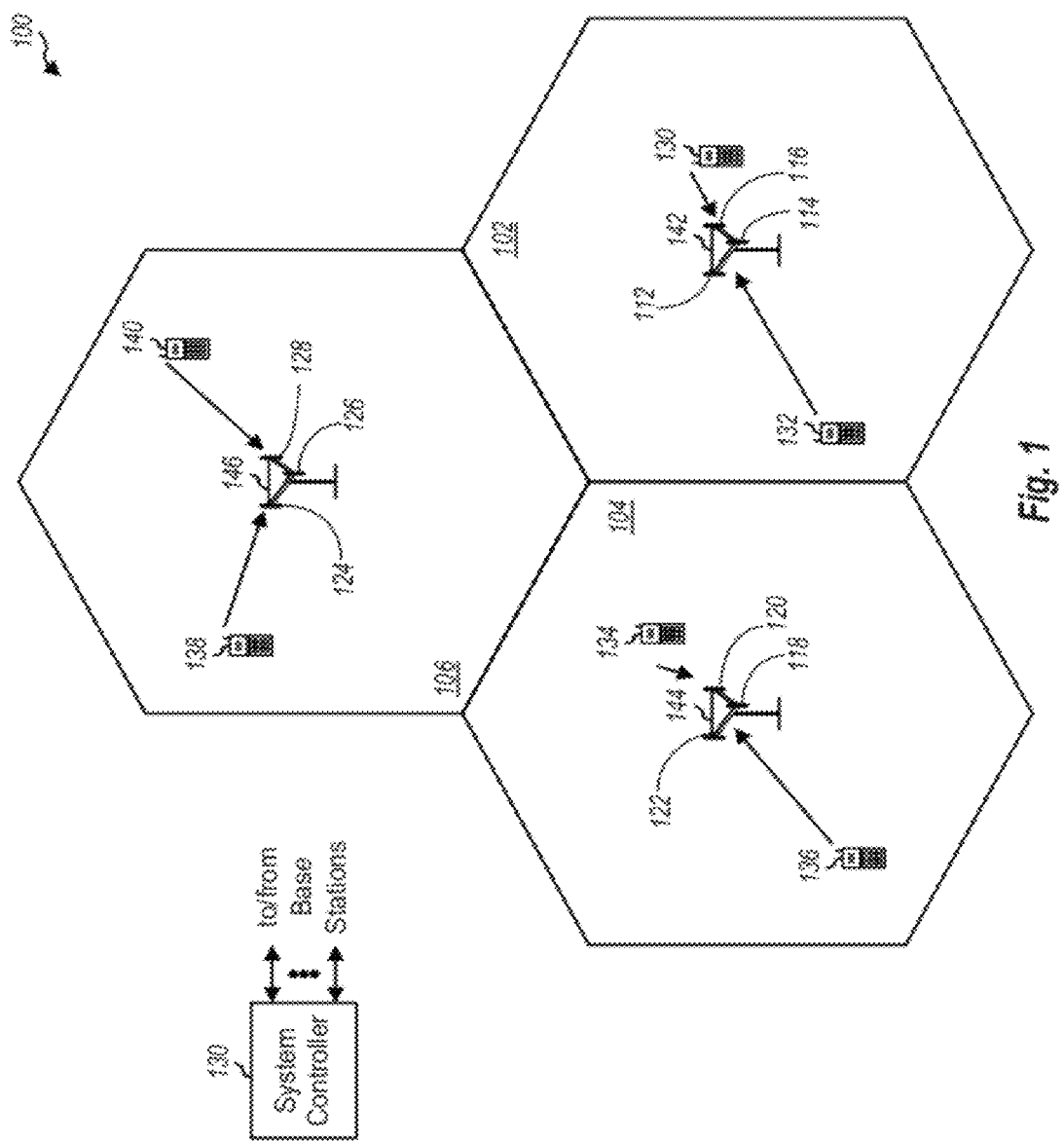
FIG. 1 is a simplified functional block diagram of an embodiment of a wireless communication system.

A wireless communication system can implement SDMA by providing multiple antenna beams positioned to support a predetermined coverage area. The communication system can implement the antenna beams as multiple directional antennas, beamformed or beamsteered antennas, and the like, or a combination thereof. The multiple antenna beams can be configured to support a predetermined coverage area. The predetermined coverage area can be substantially omni-directional, or can be limited, such as a sector of a coverage area that is modeled as being circular or hexagonal.

Each of the multiple beams can support a substantially independent area within the predetermined coverage area. Furthermore, the beams can be associated with beam sets, where each beam set supports the predetermined coverage area. The beams of a beam set are substantially non-overlapping, such that transmissions in one beam do not substantially contribute to interference in an adjacent beam of the same beam set. The beam sets can be configured such that a major beam from a first set occurs within a boundary of one or more adjacent beams from a second set. In this manner the first beam set provides strong beam coverage in areas of weak beam coverage from the second beam set. A beam set need not be a plurality of independent beams, but can be a plurality of different beam axes to which a beam can be steered using, for example, transmit signal weighting to beamsteer the broadcast signal.

The wireless communication system can also associate a resource with each beam set. Ideally, the resources associated with each beam set is substantially orthogonal to a similar resource associated with any other beam set. Examples of orthogonal resources include, but are not limited to, frequency, time, coding, interlacing, and the like, or some combination thereof.

The wireless communication system can determine a servicing beam and associated beam set and orthogonal resource for each communication link. The wireless communication system can determine that a communicating device is transitioning towards a beam edge. For example, the communicating device can provide a feedback or overhead message reporting one or more metrics, messages, or other information that is related to position within a beam of a beam set.

The wireless communication system can transition the communication link from an edge of a beam in a beam set having an associated orthogonal resource to a second beam set having a beam with a major lobe overlapping the present beam edge. The beam in the second beam set has a different associated orthogonal resource. The communication system transitions the communication link from a beam in the first beam set and first orthogonal resource to a beam in a second beam set with a second orthogonal resource.

In one embodiment, a cellular wireless communication system can implement SDMA in one or more base stations using beamformed omni-directional antennas. Using beamforming technique, omni antennas can be used with space-division multiple access (SDMA) technique to create beams at different spatial direction to achieve virtual sectorization of a cellular system. For example, a base station can generate beams using multiple omni-directional antennas to achieve peak beam gains at 0°, 60°, and 120° and their mirror response 180°, 240°, and 300° to form 3-beam SDMA system in a cell.

It is desirable to have uniform beam coverage over the cell coverage area. However, communication devices situated at an overlapping area of two beams will experience very low signal to interference ratio (SINR) due to non-separable interference from other beams which has comparable power to the desired signal power. Therefore, such fixed beam coverage is not ideal for wireless devices positioned near a beam boundary.

The cellular wireless communication system can implement one or more complementary beam sets having peak beam gains positioned at the overlap of adjacent beams from a distinct beam set, and substantially midway between the major axes of adjacent beams. The complementary beam sets are each associated with a distinct resource, where each resource is substantially orthogonal to the resource associated with another beam set.

FIG. 1 is a simplified functional block diagram of an embodiment of a multiple access wireless communication system 100. A multiple access wireless communication system 100 includes multiple cells, e.g. cells 102, 104, and 106. In the embodiment of FIG. 1, each cell 102, 104, and 106 may include an access point 150 that includes multiple sectors.

The multiple sectors are formed by groups of antennas each responsible for communication with access terminals in a portion of the cell. In cell 102, antenna groups 112, 114, and 116 each correspond to a different sector. For example, cell 102 is divided into three sectors, 120a-102c. A first antenna 112 serves a first sector 102a, a second antenna 114 serves a second sector 102b, and a third antenna 116 serves a third sector 102c. In cell 104, antenna groups 118, 120, and 122 each correspond to a different sector. In cell 106, antenna groups 124, 126, and 128 each correspond to a different sector.

Using beamforming or beamsteering techniques, omni antennas can be used with SDMA techniques to create beams at different spatial direction to achieve virtual sectorization of a cellular system. For example, a base station can generate beams using multiple omni-directional antennas to achieve peak beam gains at 0°, 60°, and 120° and their mirror response 180°, 240°, and 300° to form 3-beam SDMA system in a cell.

Each cell is configured to support or otherwise serve several access terminals which are in communication with one or more sectors of the corresponding access point. For example, access terminals 130 and 132 are in communication with access point 142, access terminals 134 and 136 are in communication with access point 144, and access terminals 138 and 140 are in communication with access point 146. Although each of the access points 142, 144, and 146 is shown to be in communication with two access terminals, each access point 142, 144, and 146 is not limited to communicating with two access terminals and may support any number of access terminals up to some limit that may be a physical limit, or a limit imposed by a communications standard.

As used herein, an access point may be a fixed station used for communicating with the terminals and may also be referred to as, and include some or all the functionality of, a base station, a Node B, or some other terminology. An access terminal (AT) may also be referred to as, and include some or all the functionality of, a user equipment (UE), a user terminal, a wireless communication device, a terminal, a mobile terminal, a mobile station or some other terminology.

Figure 2:
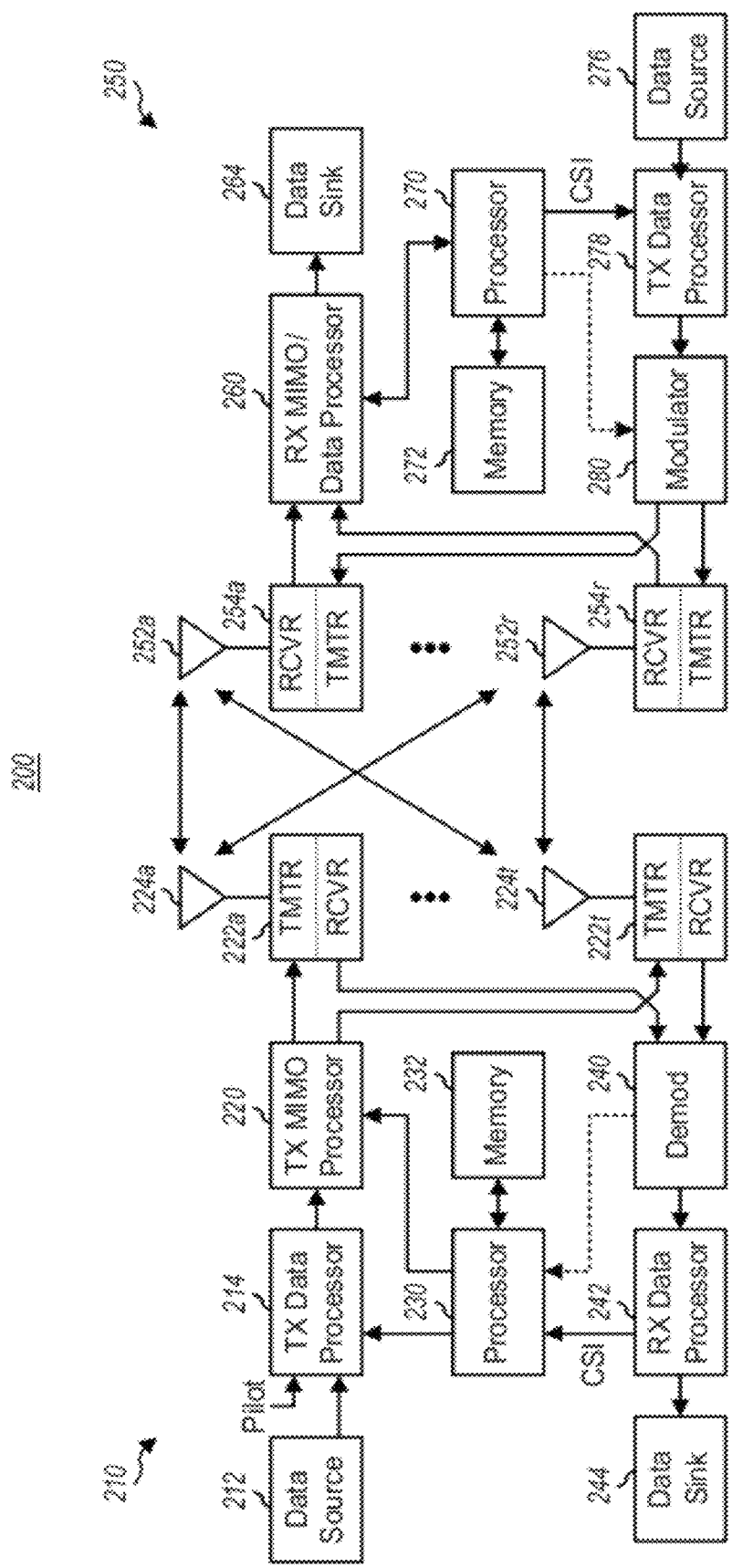
FIG. 2 is a simplified functional block diagram of an embodiment of a transmitter and receiver in a multiple access wireless communication system.

The above embodiments can be implemented utilizing transmit (TX) processor 220 or 260, processor 230 or 270, and memory 232 or 272, as shown in FIG. 2. The processes may be performed on any processor, controller, or other processing device and may be stored as computer readable instructions in a computer readable medium as source code, object code, or otherwise.

FIG. 2 is a simplified functional block diagram of an embodiment of a transmitter and receiver in a multiple access wireless communication system 200. At transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data.

TX data processor 214 can be configured to apply beamforming weights to the symbols of the data streams based upon the location of the user to which the symbols are being transmitted and the antennas from which the symbol is being transmitted. In some embodiments, the beamforming weights may be generated based upon channel response information that is indicative of the condition of the transmission paths between the access point and the access terminal. The channel response information may be generated utilizing CQI information or channel estimates provided by the user. Further, in those cases of scheduled transmissions, the TX data processor 214 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions provided by processor 230. In some embodiments, the number of parallel spatial streams may be varied according to the rank information that is transmitted from the user.

The modulation symbols for all data streams are then provided to a TX MIMO processor 220, which may further process the modulation symbols (for example, for OFDM). TX MIMO processor 220 then provides $N_T$ symbol streams to $N_T$ transmitters (TMTR) 222a through 222t. In certain embodiments, TX MIMO processor 220 applies beamforming weights to the symbols of the data streams based upon the user to which the symbols are being transmitted and the antenna from which the symbol is being transmitted from that users channel response information.

Each transmitter 222a through 222t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide the rank number of "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

At transmitter system 210, the modulated signals from receiver system 250 are received by antennas 224, conditioned by receivers 222, demodulated by a demodulator 240, and processed by a RX data processor 242 to recover the CQI reported by the receiver system. The reported CQI is then provided to processor 230 and used to (1) determine the data rates and coding and modulation schemes to be used for the data streams and (2) generate various controls for TX data processor 214 and TX MIMO processor 220.

Figure 3:
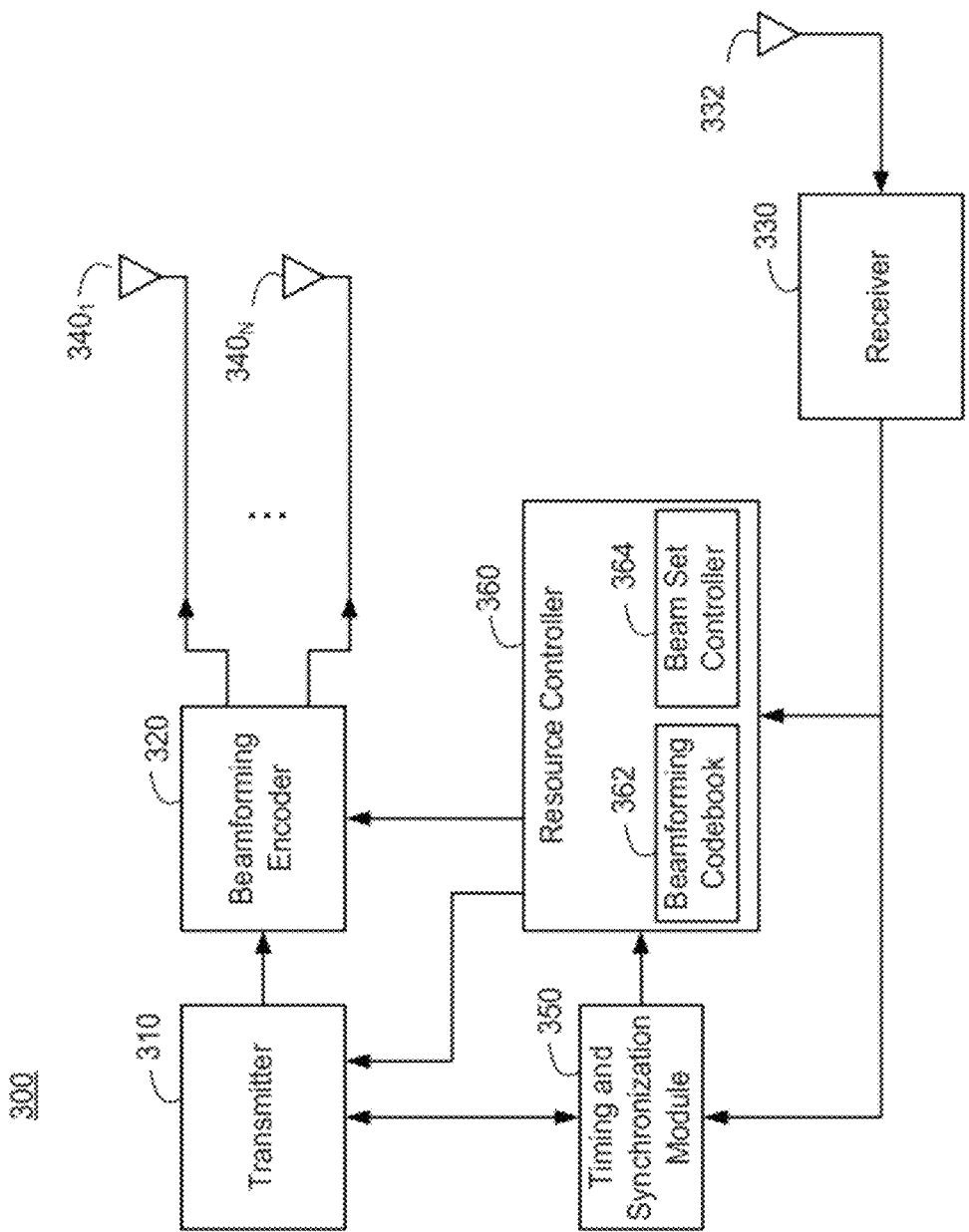
FIG. 3 is a simplified functional block diagram of an embodiment of a transmitter system supporting resource reuse in SDMA beams.

FIG. 3 is a simplified functional block diagram of an embodiment of a transmitter system 300 supporting resource reuse in SDMA beams. The transmitter system 300 of FIG. 3 can be an embodiment of, for example, the transmitter system of FIG. 2 or a transmitter system within a base station or subscriber station of the wireless communication system of FIG. 1.

The transmitter system 300 includes a transmitter 310 configured to generate one or more RF signal streams based on data or information. The transmitter 310 can be configured to receive one or more baseband signal streams and process the one or more baseband signal streams to one or more RF signal streams. For example, the transmitter 310 can be configured to generate one or more OFDM symbols based on the one or more baseband signal streams, and at least one OFDM subcarrier within a symbol can be configured to support a particular communication link. The transmitter 310 frequency converts the one or more OFDM symbols to associated RF operating bands.

The transmitter 310 includes support for one or more substantially orthogonal resources. The transmitter 310 can be configured to process the signal stream supporting a particular communication link to selectively utilize one or more of the substantially orthogonal resources based on one or more signals provided to a control input.

The transmitter 310 couples the output RF signals to a beamforming encoder 320 configured to beamform the RF signal using multiple antennas $340_1$-$340_N$. The multiple antennas $340_1$-$340_N$ can be an array of substantially similar antennas or can include multiple different antenna types, where each antenna type provides a distinct antenna pattern. For example, the antennas $340_1$-$340_N$ can be an arrangement of multiple omni-directional antennas. In another example, the antennas $340_1$-$340_N$ can be an arrangement of directional antennas, or a combination of one or more directional antennas with one or more omni-directional antennas.

A timing and synchronization module 350 is configured to provide timing signals to control event timing within the transmitter system 300. The timing and synchronization module 350 can include, for example, a clock source and a control loop that synchronizes the clock source to an external time reference. For example, the timing and synchronization module 350 can be configured to synchronize OFDM symbols generated by the transmitter system 310 to a system time. Additionally, the OFDM symbols generated by the transmitter system 300 can be arranged in sets of slots, frames, or some other arrangement, and the timing and synchronization module 350 can maintain synchronization for each arrangement of symbols.

A resource controller 360 can be configured to generate one or more control signals that control the beam set and associated resources for each communication link. The resource controller 360 can include a beamforming codebook 362 that holds the vector values used to beamform the signal stream using the multiple antennas $340_1$-$340_N$. For example, the beamforming codebook 362 can include a vector of complex weights, where each complex weight in a vector weights a signal for a corresponding antenna. As an example, the beamforming codebook 362 can include one or more storage devices, such as solid state memory.

The beamforming encoder 320 weights each sample in the signal stream with an appropriate weight vector from the beamforming codebook 362. The beamforming encoder 320 can include, for example, a signal splitter that is configured to split the signal from the transmitter 310 to N copies for N parallel signal paths, where N represents the number of antennas $340_1$-$340_N$. The beamforming encoder 320 can include a multiplier or scaler in each antenna signal path that operates to multiply the transmitter signal by a weight from a beamforming codebook 362 vector.

The beamforming encoder 320 can apply the beamforming weights to a time domain signal representation or to a frequency domain representation. Additionally, although the beamforming encoder 320 of FIG. 3 operates on the output of the transmitter 310, in other embodiments the beamforming encoder 320 can be integrated with the transmitter 310 and can operate on baseband signals, prior to frequency conversion to RF.

The resource controller 360 determines which vector from the beamforming codebook 362 to apply to a particular sample, and supplies the vector to the beamforming encoder 320. The resource controller 360 or the beamforming encoder 320 can use a reference signal from the timing and synchronization module 350 to align the timing of the vector with the appropriate signal sample.

The resource controller 360 can organize or otherwise track the beamforming vectors in the beamforming codebook 362 according to predetermined beam sets. Each beam set can include a sufficient number of beams to support a predetermined coverage area, and corresponds to beamforming vectors used to configure beams in the beam set. Each beam set can be configured to be substantially complementary to another of the beam sets, such that the beam sets to not provide substantially the same coverage within the coverage area.

In one embodiment, the major axis of a beam from a first beam set lies substantially midway between the major axes of adjacent beams from at least one other beam set. For example, in an embodiment having two beam sets, a major axis of a beam from the first beam set is positioned substantially midway between the major axes of the two adjacent beams from the second beam set. Similarly, in embodiments having three beam sets, the major axis of a beam from a first beam set lies substantially midway between the major axes of adjacent beams, where one of the adjacent beams is from a second beam set and another of the adjacent beams is from a third beam set. The location of the beams in the various beam sets can be similarly determined for any number of beam sets.

Each beam set is associated with one or more orthogonal resources, where the term orthogonal, in the context of resources associated with beam sets, includes substantially orthogonal and quasi-orthogonal. The orthogonal resources can include, but are not limited to, frequency, time, code, and the like, or some combination thereof.

As described above, the major axis of a beam from a beam set typically is positioned to lie within a null or otherwise weak coverage area of another beam set. The number of beams occupying a null between adjacent beams of a beam set is equal to one less than the number of beam sets, and relates directly to the rate of resource reuse. In general, the reuse rate is the inverse of the number of distinct beam sets and is equal to 1/K, where K represents the number of beam sets.

Figure 4:
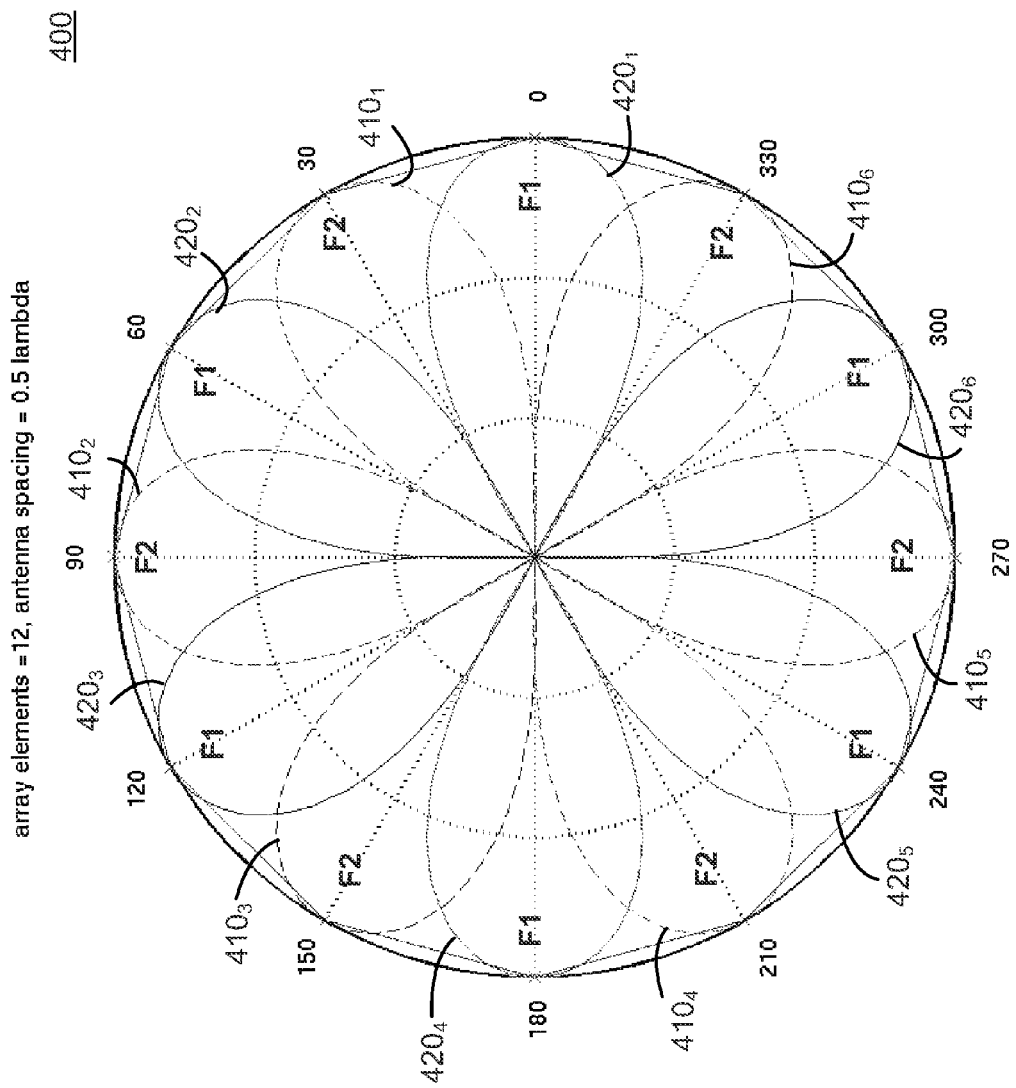
FIG. 4 is a simplified diagram of an embodiment of beam patterns for SDMA beam sets.

FIG. 4 is a simplified diagram of an embodiment of antenna patterns for multiple SDMA beam sets 400. The multiple SDMA beam sets 400 include two complementary beam sets, with each beam set having six major beam axes to support a substantially round coverage area.

A first beam set includes beams $420_1$-$420_6$ having major axis at approximately 0, 60, 120, 180, 240, and 300 degrees.

A second beam set includes beams $410_1$-$410_6$ having major axis at approximately 30, 90, 150, 210, 270, and 330 degrees. Each beam set is associated with a substantially orthogonal resource. The two beam sets provide a resource reuse of ½. For example, the first beam set is illustrated as associated with a first frequency, F1, while the second beam set is illustrated as associated with a second frequency, F2. The frequencies, F1 and F2, can represent a frequency or frequency band. For example, the frequencies F1 and F2 can represent distinct sets of subcarrier frequencies that are substantially orthogonal over a sampling rate and integration period.

Figure 5:
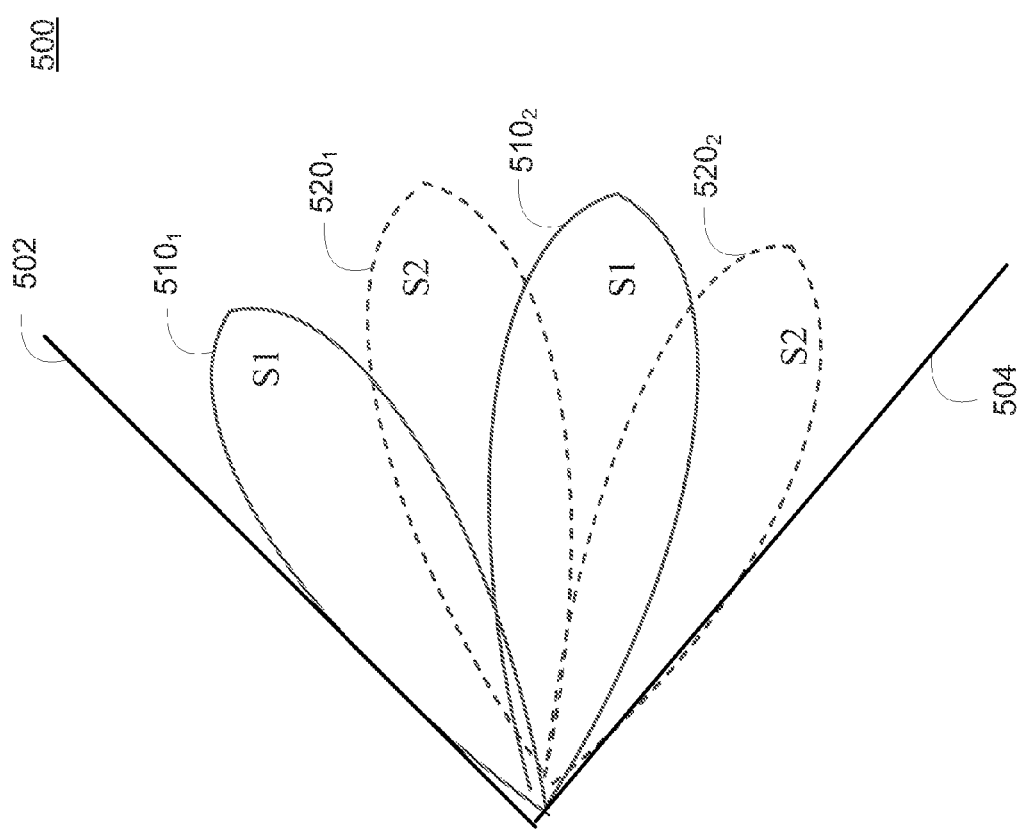
FIG. 5 is a simplified diagram of an embodiment of beam patterns for sectorized SDMA beam sets.

The beams and beam sets can be configured to support virtually any coverage area, and the coverage are need not coincide with the entire coverage area supported by a base station. FIG. 5 is a simplified diagram 500 of an embodiment of beam patterns for sectorized SDMA beam sets.

In the embodiment of FIG. 5, two beams sets, S1 and S2, are configured to support a coverage are that can be a sector of an entire coverage area supported by a base station. The sector is approximately bounded by a first sector boundary 502 and a second sector boundary 504. In a typical sectorized coverage area, the first sector boundary 502 and the second sector boundary 504 span a coverage area of approximately 120 degrees.

The first beam set, S1, includes first and second beams $510_1$ and $510_2$ that support the sector. The second beam set, S2, includes first and second beams $520_1$ and $520_2$ that support the sector and that are positioned to complement the beams of the first beam set.

The resource controller 360 includes a beam set controller 364 that is configured to track the beam set and beam associated with a particular communication link. The beam set controller 364 ensures that the appropriate codebook vectors corresponding to an active beam set are used for a particular communication link. Additionally, the beam set controller 360 controls one or more parameters related to the one or more orthogonal resources associated with the beam sets.

In one embodiment, the orthogonal resource associated with the beams sets is frequency. The transmitter 310 can be configured to generate OFDM symbols with a first set of subcarriers when supporting a first beam set and can be configured to generate OFDM symbols using a second set of subcarriers that is substantially orthogonal to the first set of subcarriers, based on the symbol time and data rate. The beam set controller 364 can be configured to control the transmitter 310 to frequency convert the OFDM symbol to an RF frequency that depends at least in part on the active beam set for the communication link. Alternatively, the transmitter 310 can be configured to generate two orthogonal OFDM symbols, each corresponding to a distinct beam set, and the beam set controller 364 can be configured to control the transmitter to selectively populate one of the OFDM symbols based on the active beam set associated with the communication link.

Where the orthogonal resource is time, the beam set controller 364 can be configured to control the time in which the transmitter 310 generates an output signal for a data sample, depending on the active beam set associated with the data sample. Similarly, if the orthogonal resource is code, the beam set controller 364 can control which code of a plurality of orthogonal codes the transmitter 310 uses to encode a particular data sample, based on the active beam set allocated to the data sample.

The transmitter 310 can be configured to generate distinct pilot signals for each of the beams in each of the beam sets. In another embodiment, the transmitter can be configured to generate a pilot signal that is shared among multiple beams in a particular beam set. The beamforming codebook 362 can be configured to provide or otherwise make accessible to the transmitter 310 beamforming vectors that are used to beamform the pilot signals to the appropriate beams. The beamforming vectors can also apply additional weights to the pilot signals to identify which of the beams the pilot signal occupies. The additional weights can be, for example, a distinct complex weight associated with each beam. In another embodiment, the beam set controller 364 can control the transmitter 310 to introduce further processing of pilot signals in order to allow identification of the beam from which the pilot signal originates. The additional processing can be, for example, a rotation, time delay, conjugation, or some other processing or combination of processing. In another embodiment, each antenna can be configured to generate a distinct pilot signal.

The transmitter system 300 also includes a receiver 330 configured to receive spatial information from a destination device, such as a subscriber station. The receiver 330 is depicted as being coupled to a distinct receive antenna 332. However, in other embodiments, the receiver 330 can utilize some or all of the antennas $340_1$-$340_N$ used in beamforming the transmit signals.

The receiver 330 can receive a communication from each supported device within the coverage area of the transmitter system 300. The communication indicate the beam in which the device resides, and can provide some indication of the position within the beam. The communication need not provide the information directly, but may provide messages, metrics, or parameters that the receiver 330 uses to determine the beam and location within the beam. For example, the device can communicate an indication of the beam identity based on the received pilot signals, and can provide a signal quality metric that is generally indicative of a proximity to a beam edge.

The receiver 330 can process the received communication in order to determine whether to initiate a beam set handoff. Alternatively, the receiver 330 can couple the received communication to the resource controller 360 and the resource controller can determine whether to initiate beam set handoff for the device.

Figure 6:
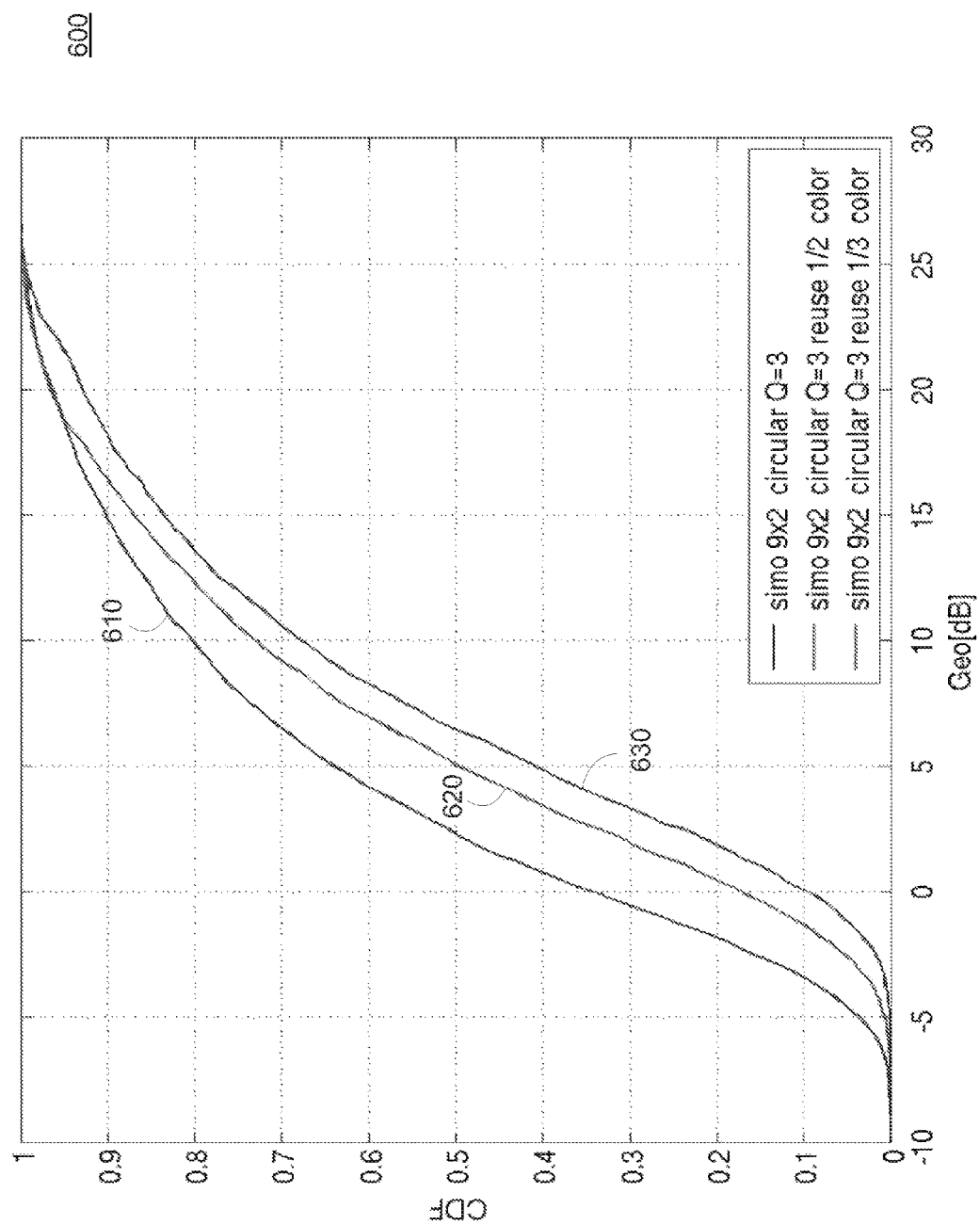
FIG. 6 is a graph of user geometry for various particular embodiments of frequency reuse SDMA.

FIG. 6 is a graph 600 of user geometry for particular embodiments of frequency reuse SDMA. The graph 600 illustrates improved user geometry (long term SINR) in ½ reuse 620 and ⅓ reuse 630 SDMA cases compared to no-reuse 610 fixed beam SDMA. Depending on the antenna elements, a gain in the order of 3-5 dB can be seen. To further improve the user geometry, the order of beam set mapping to frequency reuse set, i.e. {Si}→{Fi} can be rotated for different cell, so for two adjacent cells, two different beam sets at different orientations will be used on the same frequency set Fi. This arrangement can avoid head-to-head interference from beams from a neighboring cell, and may improve the worst user's geometry.

A reuse embodiment utilizing time or code as the orthogonal resource associated with the beam sets can implement a rotation of the beam sets of neighboring cells or coverage areas such that the time intervals or codes of adjacent cells or base station coverage areas are also orthogonalized in the appropriate dimensions with respect to each other. Similarly, reuse embodiments utilizing a combination of orthogonalizing resources can limit the overlap of similar resources in adjacent coverage areas.

As an example of the operation of beam handoffs in a frequency reuse system, the transmitter system 300 of FIG. 3 can be implemented within a base station of the wireless communication system of FIG. 1. The transmitter system 300 can be configured to generate signals within two distinct and complementary beam sets. The transmitter system 300 can implement frequency as the orthogonal resource for the beam sets. Additionally, the transmitter system 300 can transmit at least one pilot signal in each beam of a beam set, and the pilot signal in a beam can identify the beam to which it corresponds.

A destination device, such as a subscriber station within a coverage area of the transmitter system 300, receives the pilot signals and determines which of the beams and corresponding beam sets it resides. The operation of a receiver system in a destination device is described in further detail with respect to FIG. 7.

The destination device can generate and transmit to the transmitter system 300 a communication indicative of the beam set, beam, and signal quality within the beam. The destination device can, for example, transmit a signal quality metric within the communication for one or more beams and associated beam sets. The receiver 330 of the transmitter system 300 receives the communication from the destination device and determines a preferred beam and associated beam set in which the destination device is positioned. The preferred beam can be, for example, the beam and associated beam set for which the destination device experiences the best received signal quality.

The receiver 330 reports the beam and beam set information to the resource controller 360. The beam set controller 364 determines the appropriate resource control signals to provide to the transmitter 310 in order to configure the transmitter for the appropriate beam set. The resource controller 360 selects the vector or other appropriate codebook entry from beamforming codebook 362 to encode signals directed to the destination device.

The beamforming encoder 320 encodes the signals directed to the destination device using the appropriate codebook entry to beamform the communication using the multiple antennas $340_1$-$340_N$.

The receiver 330 monitors communications from the destination device to determine whether to handoff the communications to the destination device to another beam and associated beam set. The receiver 330 can, for example, compare the signal quality metrics corresponding to one or more beams. The receiver 330 can determine whether to initiate a beam handoff based on the comparison. For example, the receiver 330 can initiate a beam handoff if the signal quality metric for an adjacent beam exceeds the signal quality metric of the present serving beam by an amount greater than or equal to a predetermined handoff threshold. The complementary configuration of the various beam sets typically results in a beam set handoff when a beam handoff occurs.

The resource controller 360 can initiate a beam handoff by communicating an impending beam handoff to the transmitter 310, such that the transmitter 310 can schedule the beam handoff and communicate details regarding the beam handoff to the destination device. The transmitter 310 can communicate, for example, the timing and beam resources for the beam handoff. As an example, the transmitter 310 may implement beam handoffs at predetermined timing boundaries, such as a frame boundary. The transmitter 310 communicates the frame boundary that the beam handoff will occur and communicates the frequency, timing, code, or other resource associated with the beam set for which communications are being handed.

Figure 7:
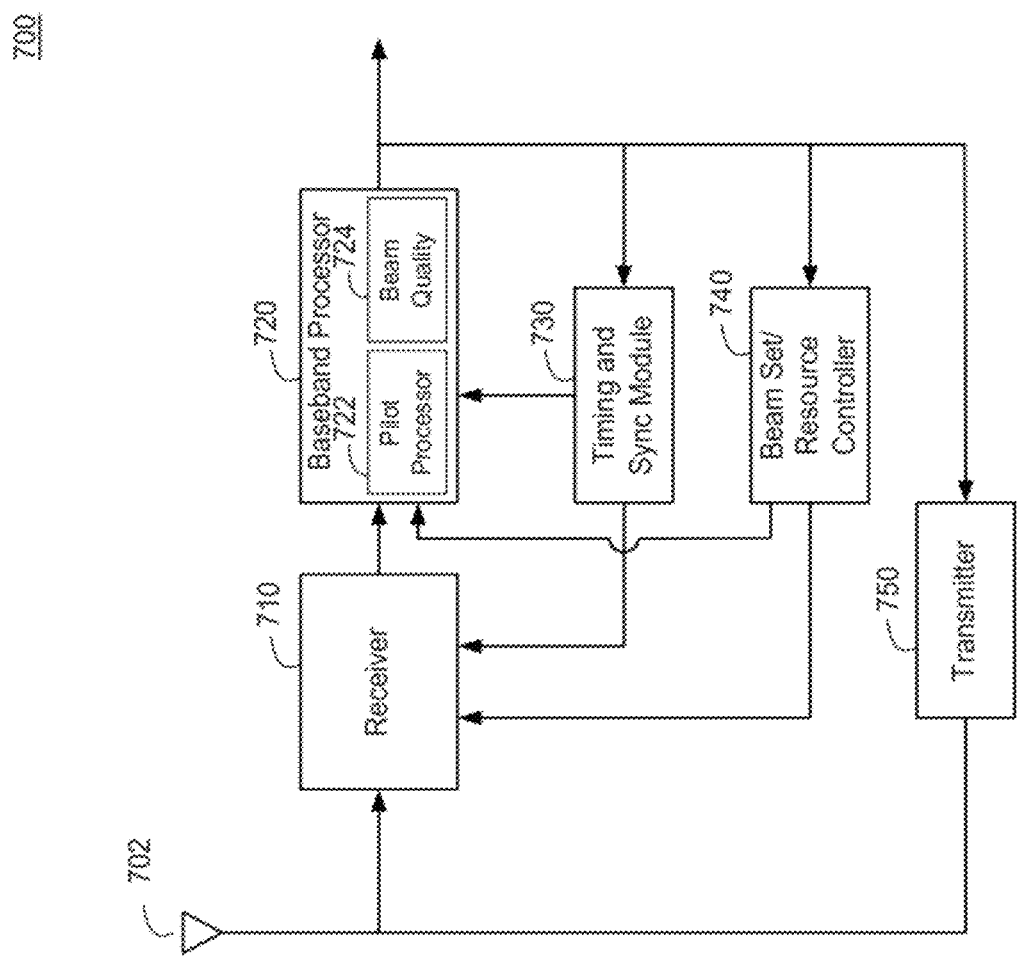
FIG. 7 is a simplified functional block diagram of an embodiment of a receiver system supporting resource reuse in SDMA beams.

FIG. 7 is a simplified functional block diagram of an embodiment of a receiver system 700 supporting resource reuse in SDMA beams. The receiver system 700 can be implemented, for example, within a subscriber station of FIG. 1. The receiver system 700 is configured to monitor one or more beam sets in a coverage area supported by multiple beam sets. The receiver system 700 is configured to transmit a communication to a transmitter system that is indicative of one or more beams in one or more beam sets that can support a communication link with the receiver system 700.

The receiver system 700 includes a receiver 710 configured to receive the one or more beamformed signals via an antenna 702. The receiver 710 filters, amplifies, and frequency converts the received signals to baseband signals.

The receiver 710 can receive one or more timing and synchronization signals from a timing and synchronization module 730 to assist in synchronizing the receiver 710 with the received signal. For example, communications between the receiver system 700 and a corresponding transmitter system may be implemented as Time Division Duplex (TDD) or Time Division Multiplex (TDM) communications, and the timing and synchronization module 730 can operate to maintain the timing of the receiver system 300 relative to a system time.

The receiver 710 can also be configured to receive and process signals from multiple beams, corresponding to multiple beam sets. The receiver 710 can process all of the received signals such that the receiver system 700 can report signal metrics or some other signal quality information for an active beam as well as one or more candidate beams, which may be associated with one or more alternative beam sets.

The receiver system 700 includes a beam set/resource controller 740 that is configured to control the receiver 710 to enable the receiver 710 to receive and process the signals on the multiple beam sets. For example, the beam set/resource controller 740 can track a frequency, timing, or some other resource or combination of resources associated with the multiple beam sets. The beam set/resource controller 740 configures the receiver 710 to process the received signals according to each of the beam set resources. The beam set/resource controller 740 can be configured to control the receiver 710 to process the different beam sets corresponding to different resources sequentially or concurrently, depending on the resources differentiating beam sets. For example, the beam set/resource controller 740 can control the receiver 710 to process received signals from distinct beam sets sequentially where the resource associated with the beam sets is a distinct time. The beam set/resource controller 740 can control the receiver 710 to process received signals from distinct beam sets concurrently, where the resource associated with the beam sets is frequency or code. Of course, the beam set/resource controller 740 can control the receiver 710 to process received signals distinct beam sets sequentially, even if the signals from the different beam sets can be processed concurrently.

The receiver 710 couples the baseband signals resulting from processing of the received signals to a baseband processor 720 for further processing. The baseband processor 720 can be configured to process the received signals from an active communication link to recover underlying data or information. The baseband processor 720 can be configured to couple the data and information to an appropriate destination device output port (not shown).

The baseband processor 720 can also be configured to generate the communication to the transmitter system having the metric or quality assessment of the various beams and beam sets. The baseband processor 720 can include, for example, a pilot processor 722 and a beam quality module 724.

The pilot processor 722 can be configured to process the pilot signals in the multiple beams corresponding to multiple beam sets. The pilot processor 722 can be configured to generate a quality metric based on the processed pilot signals, or can couple pilot information to the beam quality module 724 where a beam quality metric is generated for the active beam an done or more candidate beams. A candidate beam can be, for example, a beam adjacent to the active beam for which the receiver system 700 monitors for the possibility of handoff.

The pilot processor 722 may also determine an estimate of the channel corresponding to each of the beams, and may generate a message to the transmitter system indicative of the channel for each beam. The pilot processor 722 can also be configured to process pilot signals with substantially no knowledge of the originating beam, and report a metric relating to the received pilot signals back to the transmitter system. The transmitter system can determine the appropriate beam based on the reported pilot metrics and may select the appropriate beam set and beam.

The beam quality module 724 can determine a beam quality metric based on, for example, the results of the pilot processing. The beam quality module 724 can alternatively, or additionally, determine a beam quality metric based on a signal quality in each of multiple received beams. The various signal quality metrics can, for example, correspond to multiple beam sets, each beam set associated with at least one distinct resource. The signal quality metrics can include, for example, a received signal strength indication, a signal to noise ratio, a symbol error rate, and the like, or some other signal quality metric or combination of signal quality metrics.

The baseband processor 720 can utilize the information from the pilot processor 722 and the beam quality module 724 to generate a communication to the transmitter system indicative of beam quality. In an embodiment, the baseband processor 720 can generate a communication including all of the information received from the pilot processor 722 and beam quality module 724. In another embodiment, the baseband processor 720 can generate a communication identifying a preferred beam and beam set. In another embodiment, the baseband processor 720 can generate a communication identifying a preferred codebook entry or preferred beam weights.

The baseband processor 720 couples the communication to a transmitter 750. The transmitter 750 processes the communication for transmission to the transmitter system. The transmitter 750 can, for example, upconvert the communication to an RF band and process the communication to the appropriate air interface format.

Figure 8A:
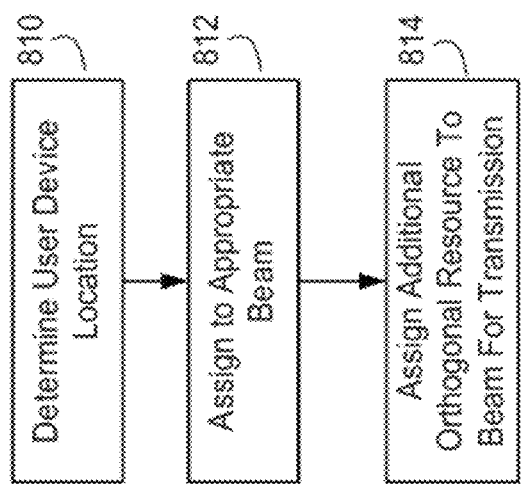
Figure 8B:
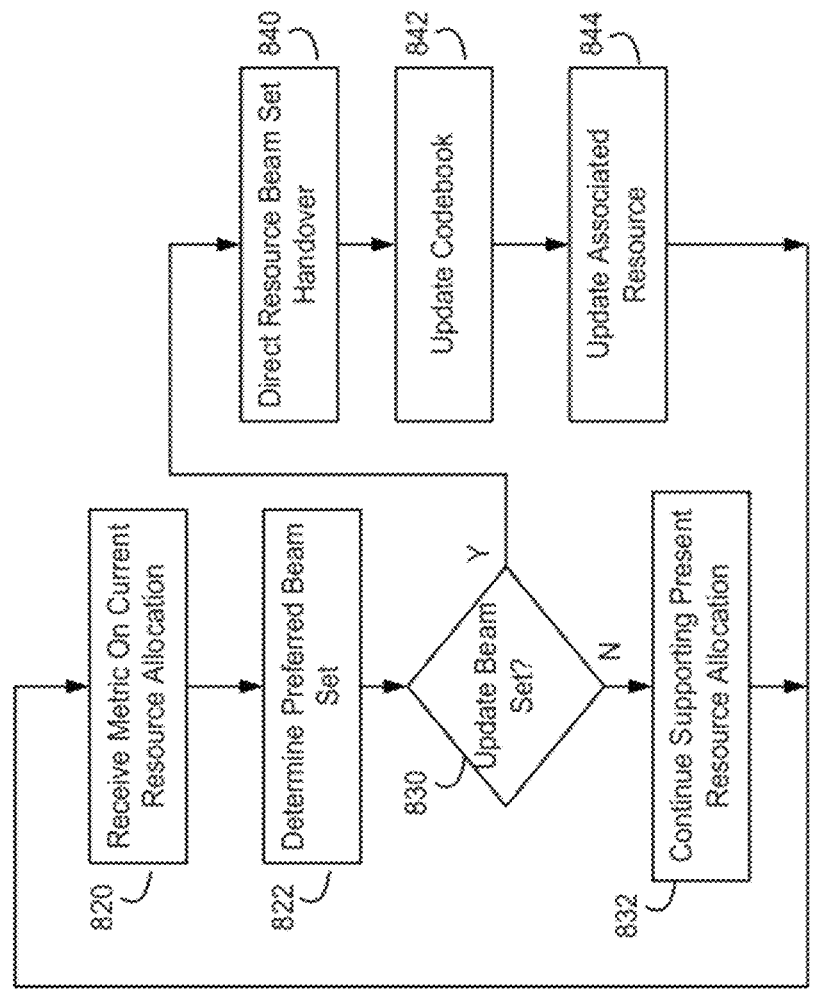

FIGS. 8A-8C are simplified flowcharts of embodiments of methods of resource reuse in a SDMA system. FIGS. 8A and 8B illustrate methods of resource reuse that can be implemented in a transmitter system, and FIG. 8C illustrates a method of resource reuse that can be implemented within a receiver system.

FIG. 8A is a flowchart of an embodiment of a method 800 for assigning a user device to a beam in a wireless communication environment in accordance with one or more embodiments presented herein. The spatial relationship between the user device and the base station or some other terminal information is determined (block 810). The location of the user device can be determined based upon the spatial signal of the base station-user device pair. Alternatively, the user device can include a global positioning system (GPS) capable of determining the location of the user device. The appropriate beam for the user is then selected or otherwise determined based upon the terminal information, which can include the position or location of the terminal (block 812).

In certain aspects, the appropriate beam is selected based upon user positioning. In other aspects, both blocks 810 and 812 may be performed by a single block responsive to information from a user indicating the beam to use. This may be performed by, for example, selecting a beam associated with a particular codebook entry.

The beam is then associated with the additional orthogonal resource assigned to the beam (block 814). Each beam in a beam set can be associated with a subset of the orthogonal resources. The additional orthogonal resource may be, for example, a time period not utilized for transmission on adjacent beams, an orthogonal or quasi-orthogonal code not utilized for transmission on adjacent beams, or a set of subcarriers associated with the beam. The associated orthogonal resource may vary over time due to channel conditions for a given beam, the number of users assigned to the beam, combinations thereof or some other parameters. Also, in some cases, the amount of orthogonal resources assigned to a given beam may vary over time. That is, the number of subcarriers per subset or the length or number of time periods may vary.

The beam with the associated orthogonal resource can be transmitted or otherwise broadcast to the user device. As the terminal information changes, the base station may transition the transmission of signals from a first beam of a first beam set to a beam from another beam set distinct from the first beam set. The different beam sets may be associated with different subsets of orthogonal resources.

FIG. 8B is a flowchart of an embodiment of a method 802 of resource reuse that can be implemented within a transmitter system, such as the transmitter system of FIG. 3 or a transmitter system in a base station of FIG. 1.

The method 802 begins at block 820. The transmitter system is already configured to support communications with a receiver system over a communication link on a beam of a beam set. At block 820, the transmitter system receives the communication having the one or more signal quality metrics or associated information from the receiver system.

The transmitter system proceeds to block 822 and determines, based at least in part on the received communication, the preferred beam and associated beam set. The transmitter system proceeds to decision block 830 and determines whether to update the beam and beam set servicing the receiver system.

The transmitter system can, for example, initiate a beam handoff immediately upon sensing that a preferred beam is different from a current beam serving the receiver system. In another embodiment, the transmitter system may utilize some threshold or hysteresis in the decision to initiate a beam handoff, in order to reduce the possibility of rapidly toggling between beam assignments. For example, the transmitter system may initiate a beam handoff when the signal quality of a proposed beam exceeds the signal quality of the serving beam by some predetermined threshold. In another example, the transmitter system may initiate a beam handoff when the signal quality of a proposed beam exceeds the signal quality of the serving beam in excess of a hysteresis time period.

Once the transmitter system determines that a beam handoff is to be initiated, the transmitter system determines if the beam handoff requires an associated handoff of the serving beam set.

If no beam set handoff is required, such as when no beam handoff is scheduled or when a beam handoff to a serving beam set is scheduled, the transmitter system proceeds from decision block 830 to block 832 and continues to support the present resource allocation. That is, because a beam set handoff is not scheduled, the transmitter system does not need to change the associated resources. The transmitter system may update the beam weights from the codebook, if a beam handoff within the same beam set is desired. The transmitter system returns to block 820 to continue to monitor communications from the receiver system.

If the transmitter system determines at decision block 830 that a beam set handoff is desired, the transmitter system proceeds to block 840. At block 840, the transmitter system initiates a beam set handover. The transmitter system can communicate the timing of the beam set handoff and the resources associated with the updated beam set to the receiver system. The transmitter system can communicate the information to the receiver system using an overhead channel on the current resource and beam set allocation.

The transmitter system proceeds to block 842 and updates the beamforming weights by selecting the appropriate codebook entry. The application of the updated beamforming weights to the signal results in the signal being beam formed by the multiple transmit antennas.

The transmitter system proceeds to block 844 and revises the resources utilized in the communication link to correspond with the resources associated with the beam set. At a handover boundary, for example a frame boundary, the transmitter system directs a handover of communications with the receiver system to the new beam in the new beam set. The transmitter system updates the beam set and the associated resources corresponding to the particular communication link. The transmitter system can update, for example, the frequency, time slot, code, or some other resource associated with the beam set. The transmitter system returns to block 820 to monitor communications from the receiver system.

FIG. 8C is a flowchart of an embodiment of a method 804 of resource reuse. The method 804 can be implemented, for example, by the receiver system of FIG. 7 and may be implemented in a subscriber system of the wireless communication system of FIG. 1.

The method 804 begins at block 850 where the receiver system receives signals over multiple resources. The multiple resources correspond to the resources associated with each of the different beam sets supported by the transmitter system. The receiver system can receive the signals with the different resources concurrently, sequentially, or according to a predetermined schedule or algorithm.

The receiver system proceeds to block 852 and determines a quality metric for each of the received signals based on the beam set resources. For example, the receiver system can determine a quality metric based on the particular received signals using the resources for a beam set, and may not associate a quality metric with any particular beam of a beam set. Alternatively, the receiver system may have the ability to discern a beam and corresponding beam set for the received signals, and can be configured to generate a quality metric for multiple beams and beam sets. For example, the receiver system may receive multiple pilot signals, and may be able to determine a particular beam of a beam set based on the received pilot signals. In such an embodiment, the receiver system may generate a quality metric for multiple beam and beam set pairs. The quality metric can be virtually any information from which the transmitter system can correlate communication link performance. For example, the quality metric can be a signal to noise ratio within a beam of a beam set, a received signal strength, a channel estimate, or some other information.

The receiver system proceeds to block 854 and transmits the one or more quality metrics to the transmitter system, which may include the base station serving the coverage area in which the receiver system resides. Alternatively or additionally, the receiver system can communicate a desired beam and beam set to the transmitter system.

The receiver system proceeds to decision block 860 and determines if a beam and beam set handoff has been initiated. The beam and beam set handoff can be initiated as a result of the most recent communication of quality metrics or can be based on one or more past communications. The transmitter system can communicate a message, command, or instruction to the receiver system initiating a beam and beam set handoff and a time, boundary, or event associated with the handoff.

If the receiver system determines that no beam set handoff is scheduled, the receiver system proceeds from decision block 860 back to block 850 and continues to monitor received signals. In some embodiments, the receiver need not have any knowledge of the particular beam in which it is operating. It only needs to operate with the resources associated with the active beam set. Thus, the receiver system need not alter any signal processing when no beam set handoff occurs.

If the receiver system determines at decision block 860 that a beam set handoff is scheduled, the receiver system proceeds to block 870. At block 870, the receiver system determines the timing and resources associated with the beam set handover. The receiver system can, for example, receive the beam set and handover timing information. The receiver system can receive a message controlling the resources associated with a beam set or can include a look up table in memory that associates the resources with the beam sets. The receiver system can synchronize the resource update with the timing of the handover.

The receiver proceeds to block 880. At block 880 the receiver system controls the appropriate portion of the receiver system to transition to the resource associated with the updated beam set at the handover instance. For example, where the distinct resource associated with the beam sets includes a time allocation, the receiver system can resynchronize to the appropriate time slot. Similarly, where the distinct resource associated with the beams sets is frequency, the receiver system can update a local oscillator frequency that is used to frequency convert the received signal from the updated frequency to baseband. The receiver system then returns to block 850 to receive and process signals with the new beam set and resource allocation.

Figure 9:
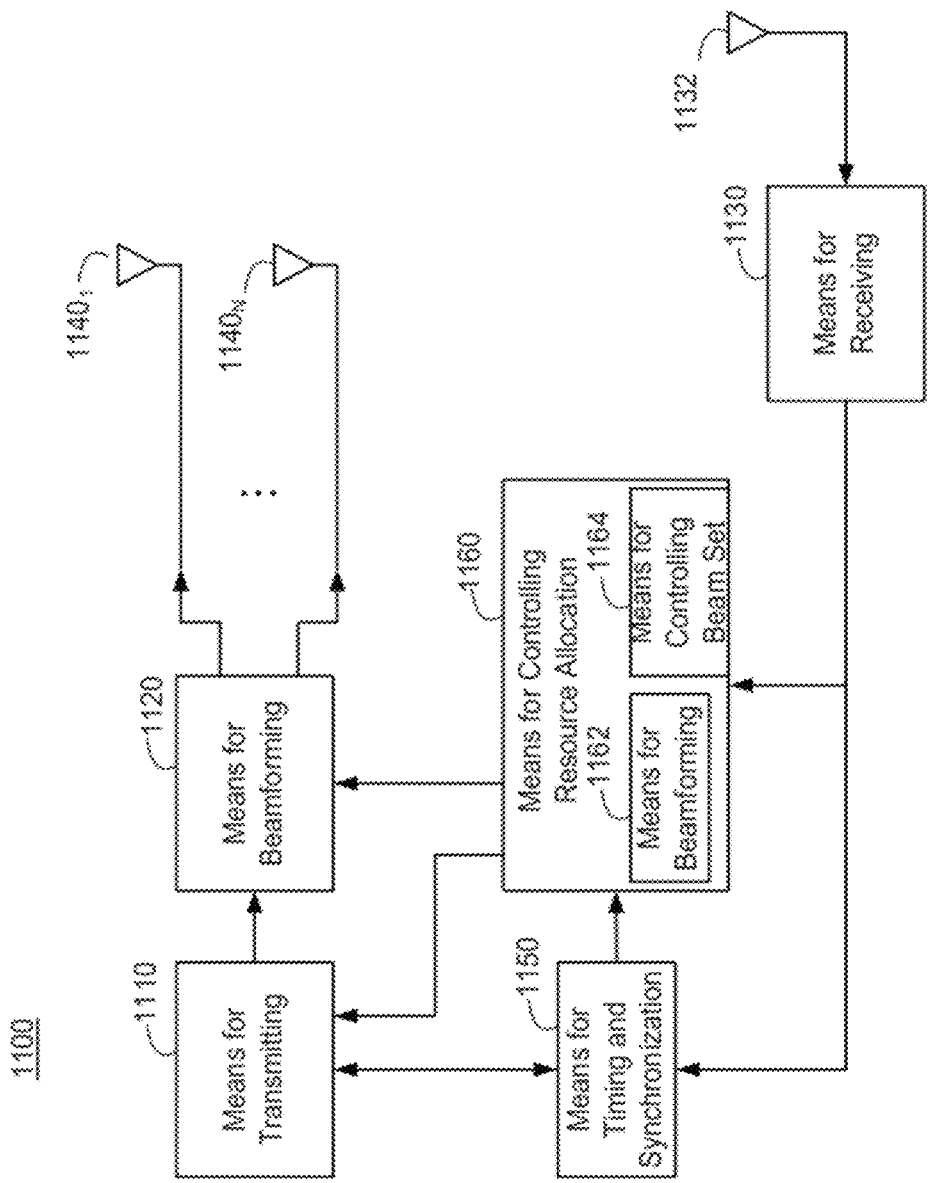
FIG. 9 is a simplified functional block diagram of an embodiment of a transmitter system supporting resource reuse in SDMA beams.

FIG. 9 is a simplified functional block diagram of an embodiment of a transmitter system 1100 supporting resource reuse in SDMA beams. The transmitter system 1100 includes a means for transmitting a signal 1110 that includes a means for generating a transmit signal.

A means for receiving 1130 can be configured to receive, via a receive antenna 1132, one or more signals from a signal source, such as a user terminal, and can determine terminal information based on the received signals. The terminal information can include, for example a location of a terminal in a coverage area or can include an angular position of a terminal in a coverage area.

The transmitter system 1100 also includes a means for timing and synchronization 1150 coupled to the means for transmitting and configured to provide one or more timing signals to synchronize or otherwise control the timing of operations within the means for transmitting a signal. The means for timing and synchronization 1150 can operate in conjunction with the means for receiving 1130 to determine the terminal information.

A means for controlling a resource allocation 1160 includes means for beamforming 1162 that can include a means for storing at least one beamforming codebook defining multiple beamforming vectors in each of multiple beam sets. The means for controlling a resource allocation 1160 includes means for controlling a beam set that includes means for determining a first beam of a first beam set for supporting a communication link, each beam of the first beam set associated with a first resource. The first beam set can be part of a plurality of beam sets, where each beam in the first beam set is associated with a subset of resources of a plurality of resources.

The means for controlling a resource allocation 1160 can also include means for determining a first beam of a second beam set for supporting the communication link, each beam of the second beam set associated with a second resource that is distinct from the first resource, when a received signal indicates that a beam set a handover is to occur.

A means for beamforming signals 1120 can be configured to generate a plurality of copies of a transmit signal from the means for transmitting, and can include a means for applying a distinct beamforming weight from a beamforming vector associated with the beam for each of the plurality of transmit signal copies to generate weighted signals. The means for beamforming signals 1120 couples the weighted signals to the multiple antennas $1140_1$-$1140_N$ for transmitting to a destination device within a coverage area.

A means for receiving a communication 1130 can receive the communication from a receive antenna 1132 and can determine a beam set transition event based on the communication. The means for receiving a communication 1130 can initiate a beam set handover in response to the communication. For example, the means for receiving a communication 1130 can control the means for controlling resource allocation 1160 to control the means for transmitting 1110 and means for beamforming 1120 to beamform or otherwise beamsteer the transmit signals to a beam from a second beam set using a second resource in place of using the first beam set and associated first resource.

Figure 10:
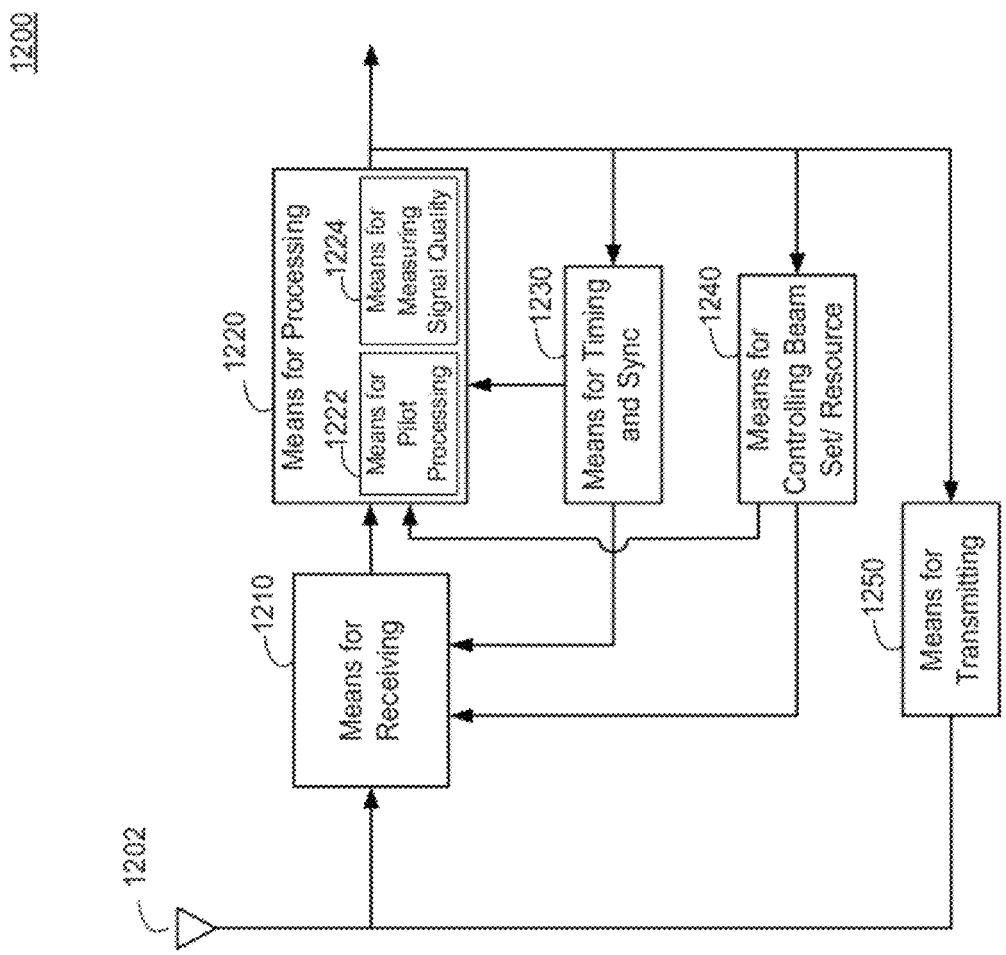
FIG. 10 is a simplified functional block diagram of an embodiment of a receiver supporting resource reuse in SDMA beams.

FIG. 10 is a simplified functional block diagram of an embodiment of a receiver system 1200 supporting resource reuse in SDMA beams. The receiver system 1200 includes a means for receiving signals 1210 across multiple substantially orthogonal resources, where the signals are transmitted over at least a portion of the multiple substantially orthogonal resources. The means for receiving signals 1210 can include a means for receiving a beamformed signal utilizing at least one of the multiple orthogonal resources based on a communication received from a signal source, such as a transmitter system or base station.

The means for receiving signals 1210 can be controlled to support each of the multiple substantially orthogonal resources based on one or more control signals from a means for controlling beam set/resource 1240. The means for controlling beam set/resource 1240 can include a look up table or registers listing each of the multiple substantially orthogonal resources, and the corresponding control signals needed to control the receiver system 1200 to support communications utilizing the resource.

A means for timing and synchronization 1230 can be configured to maintain synchronization or timing reference that is used by the means for receiving signals 1210 when processing the received signals. A means for processing 1220 is configured to further process the signals from the means for receiving signals 1210. The means for processing 1220 can include a means for measuring or otherwise determining at least a quality metric 1224 that determines a signal quality metric for each of the substantially orthogonal resources. The means for processing 1220 can also include a means for pilot processing 1222 that is configured to process received pilot signals in order to assist in generating the signal quality metrics.

The receiver system 1200 includes a mean for transmitting a communication 1250 configured to receive the signal quality metrics and generate a communication that is transmitted to a base station. The communication can be the actual signal quality metrics or can be based on the quality metrics. For example, the means for transmitting a communication 1250 can be configured to transmit a beam set selection indication rather than a quality metric value.

Methods and apparatus for supporting resource reuse in a SDMA system have been described herein. The system can support multiple beam sets, with each beam set having multiple beam supporting a predetermined coverage area. Each beam set can be substantially complementary to a distinct beam set, such that the major beam axes for a first beam set lie approximately midway between the major beam axes of the closest adjacent beams. The closest adjacent beams are typically from distinct beam sets, but do not need to be from the same beam set.

Each beam set is associated with a particular resource, and the resources associated with the beam sets can be orthogonal or substantially orthogonal. The number of distinct beam sets and corresponding number of substantially orthogonal resources define a reuse set or reuse rate.

The complementary placement of the beams in the distinct beam sets reduces the amount of interference experienced in each beam, while providing substantially uniform support over the entire coverage area.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

For a firmware and/or software implementation, the techniques described herein may be implemented as instructions (for example, procedures, functions, and so on) that perform the functions described herein. The firmware and/or software codes may be stored in a memory and executed by a processor or processors. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. An apparatus configured to support resource reuse in a wireless communication system, the apparatus comprising:
   a transmitter configured to generate a transmit signal utilizing at least one of a plurality of resources based on one or more control signals;
   a resource controller configured to generate the one or more control signals to the transmitter controlling a selection of the at least one of a plurality of resources;
   an encoder coupled to the transmitter and the resource controller and configured to encode the transmit signal to a first beam from a first beam set associated with the at least one of the plurality of resources; and
   a plurality of antennas coupled to the encoder and configured to broadcast the encoded transmit signal in the first beam;
   wherein the first beam set comprises a subset of a plurality of beam sets, and wherein a second beam set comprising a second subset of the plurality of beam sets is associated with a resource distinct from the at least one of the plurality of resources associated with the first beam set; and
   wherein the first beam set is substantially complementary to the second beam set.

2. The apparatus of claim 1, wherein the encoder is configured to store a beamforming codebook, and wherein the encoder is configured to weight the transmit signal with entries from the beamforming codebook.

3. The apparatus of claim 1, wherein the encoder is configured to weight the transmit signal with complex weights to beam steer the encoded transmit signal.

4. The apparatus of claim 1, wherein the plurality of resources comprise substantially orthogonal resources.

5. The apparatus of claim 1, wherein the plurality of resources comprise subcarriers in an orthogonal frequency division multiple access (OFDMA) system and wherein a first subset of subcarriers associated with the first beam set is substantially orthogonal with a second subset of subcarriers associated with a complementary beam set.

6. The apparatus of claim 1, wherein the at least one of the plurality of resources associated with the first beam set is substantially orthogonal to the resource associated with the second beam set.

7. An apparatus configured to support resource reuse in a wireless communication system, the apparatus comprising:
   a receiver configured to receive a first beamformed signal corresponding to a first beam set and a second beamformed signal corresponding to a second beam set, the first and second beam sets associated with at least two distinct resources;
   a baseband processor configured to process at least a portion of the first and second beamformed signals based on a corresponding resource, and configured to generate at least one quality metric for received beamformed signals of each resource; and
   a resource controller configured to control the receiver and baseband processor to support a particular resource;
   wherein the first beam set is substantially complementary to the second beam set.

8. The apparatus of claim 7, wherein the at least two distinct resources comprise substantially orthogonal resources.

9. The apparatus of claim 7, wherein the at least two distinct resources comprise distinct frequencies.

10. The apparatus of claim 7, wherein the at least two distinct resources comprise distinct time periods.

11. The apparatus of claim 7, wherein the first and second beamformed signals comprise a plurality of pilot signals.

12. A method to support resource reuse in a wireless communication system, the method comprising:
   generating a transmit signal utilizing at least one of a plurality of resources based on one or more control signals;
   generating the one or more control signals to a transmitter controlling a selection of the at least one of a plurality of resources;
   encoding the transmit signal to a first beam from a first beam set associated with the at least one of the plurality of resources; and
   broadcasting the encoded transmit signal in the first beam;
   wherein the first beam set comprises a subset of a plurality of beam sets, and wherein a second beam set comprising a second subset of the plurality of beam sets is associated with a resource distinct from the at least one of the plurality of resources associated with the first beam set; and
   wherein the first beam set is substantially complementary to the second beam set.

13. The method of claim 12, further comprising:
   storing a beamforming codebook; and
   weighting the transmit signal with entries from the beamforming codebook.

14. The method of claim 12, further comprising weighting the transmit signal with complex weights to beam steer the encoded transmit signal.

15. The method of claim 12, wherein the plurality of resources comprise substantially orthogonal resources.

16. A computer-program product for supporting resource reuse in a wireless communication system, the computer-program product comprising a non-transitory computer-readable medium having instructions thereon, the instructions comprising:
- instructions for generating a transmit signal utilizing at least one of a plurality of resources based on one or more control signals;
- instructions for generating the one or more control signals to a transmitter controlling a selection of the at least one of a plurality of resources;
- instructions for encoding the transmit signal to a first beam from a first beam set associated with the at least one of the plurality of resources; and
- instructions for broadcasting the encoded transmit signal in the first beam;
- wherein the first beam set comprises a subset of a plurality of beam sets, and wherein a second beam set comprising a second subset of the plurality of beam sets is associated with a resource distinct from the at least one of the plurality of resources associated with the first beam set; and
- wherein the first beam set is substantially complementary to the second beam set.

17. The computer-program product of claim 16, wherein the instructions further comprise:
- instructions for storing a beamforming codebook; and
- instructions for weighting the transmit signal with entries from the beamforming codebook.

18. The computer-program product of claim 16, wherein the instructions further comprise instructions for weighting the transmit signal with complex weights to beam steer the encoded transmit signal.

19. The computer-program product of claim 16, wherein the plurality of resources comprise substantially orthogonal resources.

20. An apparatus configured to support resource reuse in a wireless communication system, the apparatus comprising:
- means for generating a transmit signal utilizing at least one of a plurality of resources based on one or more control signals;
- means for generating the one or more control signals to a transmitter controlling a selection of the at least one of a plurality of resources;
- means for encoding the transmit signal to a first beam from a first beam set associated with the at least one of the plurality of resources; and
- means for broadcasting the encoded transmit signal in the first beam;
- wherein the first beam set comprises a subset of a plurality of beam sets, and wherein a second beam set comprising a second subset of the plurality of beam sets is associated with a resource distinct from the at least one of the plurality of resources associated with the first beam set; and
- wherein the first beam set is substantially complementary to the second beam set.

21. The apparatus of claim 20, further comprising:
- means for storing a beamforming codebook; and
- means for weighting the transmit signal with entries from the beamforming codebook.

22. The apparatus of claim 20, further comprising means for weighting the transmit signal with complex weights to beam steer the encoded transmit signal.

23. The apparatus of claim 20, wherein the plurality of resources comprise substantially orthogonal resources.

24. A method to support resource reuse in a wireless communication system, the method comprising:
- receiving a first beamformed signal corresponding to a first beam set and a second beamformed signal corresponding to a second beam set, the first and second beam sets associated with at least two distinct resources;
- processing at least a portion of the first and second beamformed signals based on a corresponding resource, and configured to generate at least one quality metric for received beamformed signals of each resource; and
- controlling a receiver and baseband processor to support a particular resource;
- wherein the first beam set is substantially complementary to the second beam set.

25. The method of claim 24, wherein the at least two distinct resources comprise substantially orthogonal resources.

26. The method of claim 24, wherein the at least two distinct resources comprise distinct frequencies.

27. A computer-program product for supporting resource reuse in a wireless communication system, the computer-program product comprising a non-transitory computer-readable medium having instructions thereon, the instructions comprising:
- instructions for receiving a first beamformed signal corresponding to a first beam set and a second beamformed signal corresponding to a second beam set, the first and second beam sets associated with at least two distinct resources;
- instructions for processing a first beamformed signal corresponding to a first beam set and a second beamformed signal corresponding to a second beam set, the first and second beam sets associated with at least two distinct resources; and
- instructions for controlling a receiver and baseband processor to support a particular resource;
- wherein the first beam set is substantially complementary to the second beam set.

28. The computer-program product of claim 27, wherein the at least two distinct resources comprise substantially orthogonal resources.

29. The computer-program product of claim 27, wherein the at least two distinct resources comprise distinct frequencies.

30. An apparatus configured to support resource reuse in a wireless communication system, the apparatus comprising:
- means for receiving a first beamformed signal corresponding to a first beam set and a second beamformed signal corresponding to a second beam set, the first and second beam sets associated with at least two distinct resources;
- means for processing at least a portion of the first and second beamformed signals based on a corresponding resource, and configured to generate at least one quality metric for received beamformed signals of each resource; and
- means for controlling a receiver and baseband processor to support a particular resource;
- wherein the first beam set is substantially complementary to the second beam set.

31. The apparatus of claim 30, wherein the at least two distinct resources comprise substantially orthogonal resources.

32. The apparatus of claim 30, wherein the at least two distinct resources comprise distinct frequencies.

* * * * *